(12) United States Patent  (10) Patent No.: US 8,716,901 B2
Hsu et al.  (45) Date of Patent: May 6, 2014

(54) CIRCUIT FOR GENERATING A DIRECT CURRENT VOLTAGE AND METHOD THEREOF

(75) Inventors: Hsin-Chin Hsu, New Taipei (TW); Fang-Lih Lin, Taipei (TW)

(73) Assignee: AMICCOM Electronics Corporation, Hsinchu Science Park, Hsin-Chu (TW)

( * ) Notice: Subject to any disclaimer, the term of this patent is extended or adjusted under 35 U.S.C. 154(b) by 374 days.

(21) Appl. No.: 13/156,333

(22) Filed: Jun. 8, 2011

(65) Prior Publication Data
US 2012/0248885 A1 Oct. 4, 2012

(30) Foreign Application Priority Data
Mar. 29, 2011 (TW) .............................. 100110814 A

(51) Int. Cl.
H01F 27/42 (2006.01)
(52) U.S. Cl.
USPC ........................................................ 307/104
(58) Field of Classification Search
USPC ........................................................ 307/104
See application file for complete search history.

(56) References Cited

U.S. PATENT DOCUMENTS

2002/0082803 A1* 6/2002 Schiffbauer .................. 702/159
* cited by examiner Primary Examiner — Robert L. Deberadinis
(74) Attorney, Agent, or Firm — Winston Hsu; Scott Margo

(57) ABSTRACT

A circuit for generating a direct current voltage includes a three-axis antenna set, a first capacitor, a limiting direct current voltage generator, a second capacitor, and a low dropout regulator. The three-axis antenna set receives a signal transmitted by a reader. The first capacitor generates a first direct current voltage according to an X-axis component, a Y-axis component, and a Z-axis component of the signal. The limiting direct current voltage generator limits and converts the X-axis component, the Y-axis component, and the Z-axis component to generate an X-axis direct current voltage, a Y-axis direct current voltage, and a Z-axis direct current voltage. The second capacitor generates a second direct current voltage according to the X-axis direct current voltage, the Y-axis direct current voltage, and the Z-axis direct current voltage. The low dropout regulator generates a direct current output voltage according to the second direct current voltage.

8 Claims, 3 Drawing Sheets

CIRCUIT FOR GENERATING A DIRECT CURRENT VOLTAGE AND METHOD THEREOF

BACKGROUND OF THE INVENTION

1. Field of the Invention

The present invention is related to a circuit for generating a direct current voltage and method thereof, and particularly to a circuit for generating a direct current voltage and method thereof that can utilize a limiting direct current voltage generator to limit the direct current voltage.

2. Description of the Prior Art

Please refer to FIG. 1. FIG. 1 is a diagram illustrating an electromagnetic coupling charging circuit 100 according to the prior art. The electromagnetic coupling charging circuit 100 includes an inductor 102, an antenna capacitor 104, a diode 106, and a charging capacitor 108, where the antenna capacitor 104 is used for adjusting a resonant frequency between the antenna capacitor 104 and the inductor 102 to match a frequency of an electric wave RW transmitted by a reader 110, and the inductor 102 is used for coupling the electric wave RW transmitted by the reader 110. When an electric wave coupled by the inductor 102 provides a forward bias for the diode 106, the electric wave coupled by the inductor 102 can charge the charging capacitor 108.

However, charging efficiency of the electromagnetic coupling charging circuit 100 is poor due to an influence of a voltage drop of the diode 106. In addition, an amplitude of the electric wave coupled by the inductor 102 varies with a distance between the electromagnetic coupling charging circuit 100 and the reader 110, so a voltage of node A may damage another circuit 112.

SUMMARY OF THE INVENTION

An embodiment provides a circuit for generating a direct current voltage. The circuit includes a three-axis antenna set, a first capacitor, a limiting direct current voltage generator, a second capacitor, and a low dropout regulator. The three-axis antenna set has a first coupling terminal for receiving an X-axis component of a signal transmitted by a reader, a second coupling terminal for receiving a Y-axis component of the signal, a third coupling terminal for receiving a Z-axis component of the signal, and an output terminal. The first capacitor is coupled to the output terminal of the three-axis antenna set for generating a first direct current voltage according to the X-axis component, the Y-axis component, and the Z-axis component. The limiting direct current voltage generator has a first input terminal coupled to the first coupling terminal of the three-axis antenna set for receiving the X-axis component, a second input terminal coupled to the second coupling terminal of the three-axis antenna set for receiving the Y-axis component, a third input terminal coupled to the third coupling terminal of the three-axis antenna set for receiving the Z-axis component, a fourth terminal coupled to ground, and an output terminal for outputting an X-axis direct current voltage, a Y-axis direct current voltage, and a Z-axis direct current voltage, where the limiting direct current voltage generator is used for converting the X-axis component, the Y-axis component, and the Z-axis component to generate the X-axis direct current voltage, the Y-axis direct current voltage, and the Z-axis direct current voltage. The second capacitor is coupled to the output terminal of the limiting direct current voltage generator for generating a second direct current voltage according to the X-axis direct current voltage, the Y-axis direct current voltage, and the Z-axis direct current voltage. The low dropout regulator is coupled to the second capacitor for generating a direct current output voltage according to the second direct current voltage.

Another embodiment provides a method for generating a direct current voltage. The method includes a three-axis antenna set receiving an X-axis component, a Y-axis component, and a Z-axis component of a signal transmitted by a reader; a first capacitor generating a first direct current voltage according to the X-axis component, the Y-axis component, and the Z-axis component; a limiting direct current voltage generator limiting and converting the X-axis component, the Y-axis component, and the Z-axis component to generate an X-axis direct current voltage, a Y-axis direct current voltage, and a Z-axis direct current voltage; a second capacitor generating a second direct current voltage according to the X-axis direct current voltage, the Y-axis direct current voltage, and the Z-axis direct current voltage; a low dropout regulator generating a direct current output voltage according to the second direct current voltage.

The present invention provides a circuit for generating a direct current voltage and method thereof. The circuit and method thereof utilize a limiting direct current voltage generator to limit a voltage of a first coupling terminal, a voltage of a second coupling terminal, and a voltage of a third coupling terminal of a three-axis antenna set for overcoming a problem of the voltage of the first coupling terminal, the voltage of the second coupling terminal, and the voltage of the third coupling terminal varying severely with a signal transmitted by a reader. Thus, the present invention can avoid another circuit coupled to the first coupling terminal, the second coupling terminal, and/or the third coupling terminal of the three-axis antenna set, and a next stage circuit coupled to a low dropout regulator being damaged.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
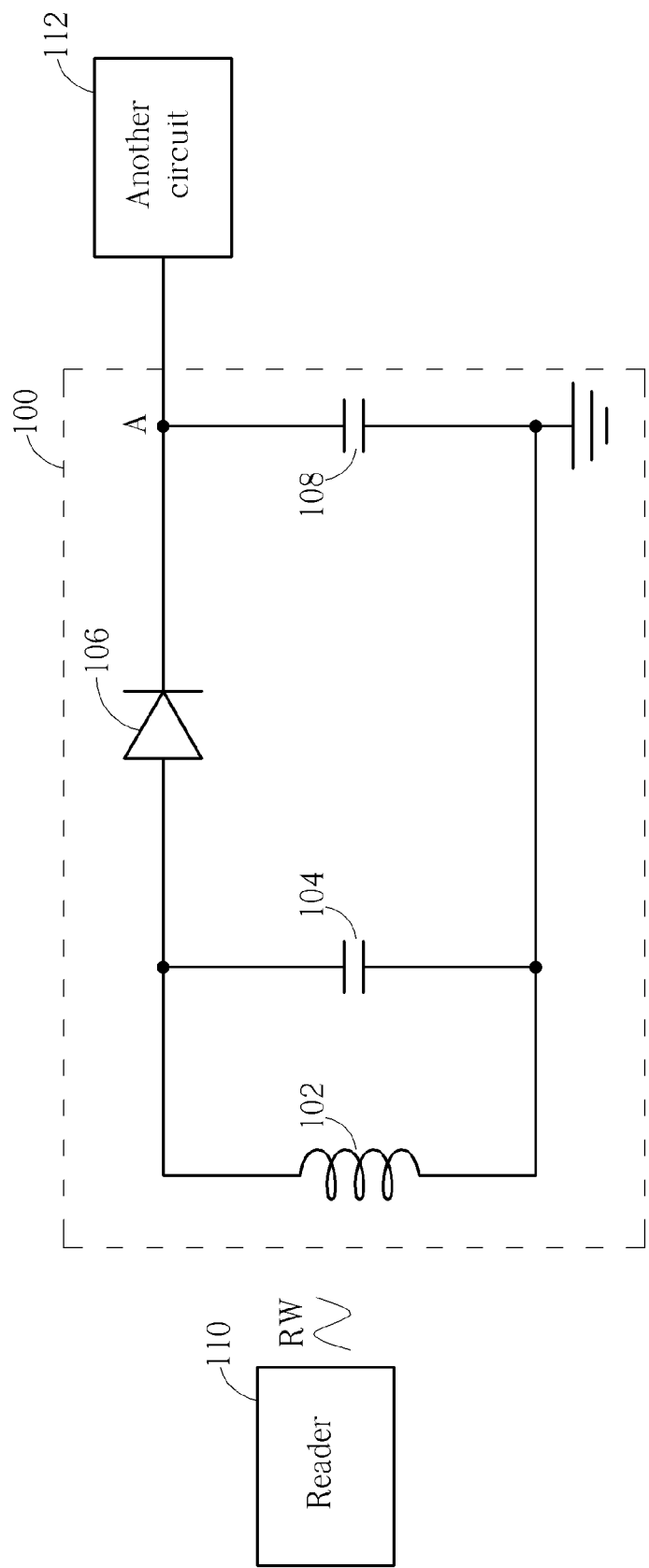
FIG. 1 is a diagram illustrating an electromagnetic coupling charging circuit according to the prior art.
Figure 2:
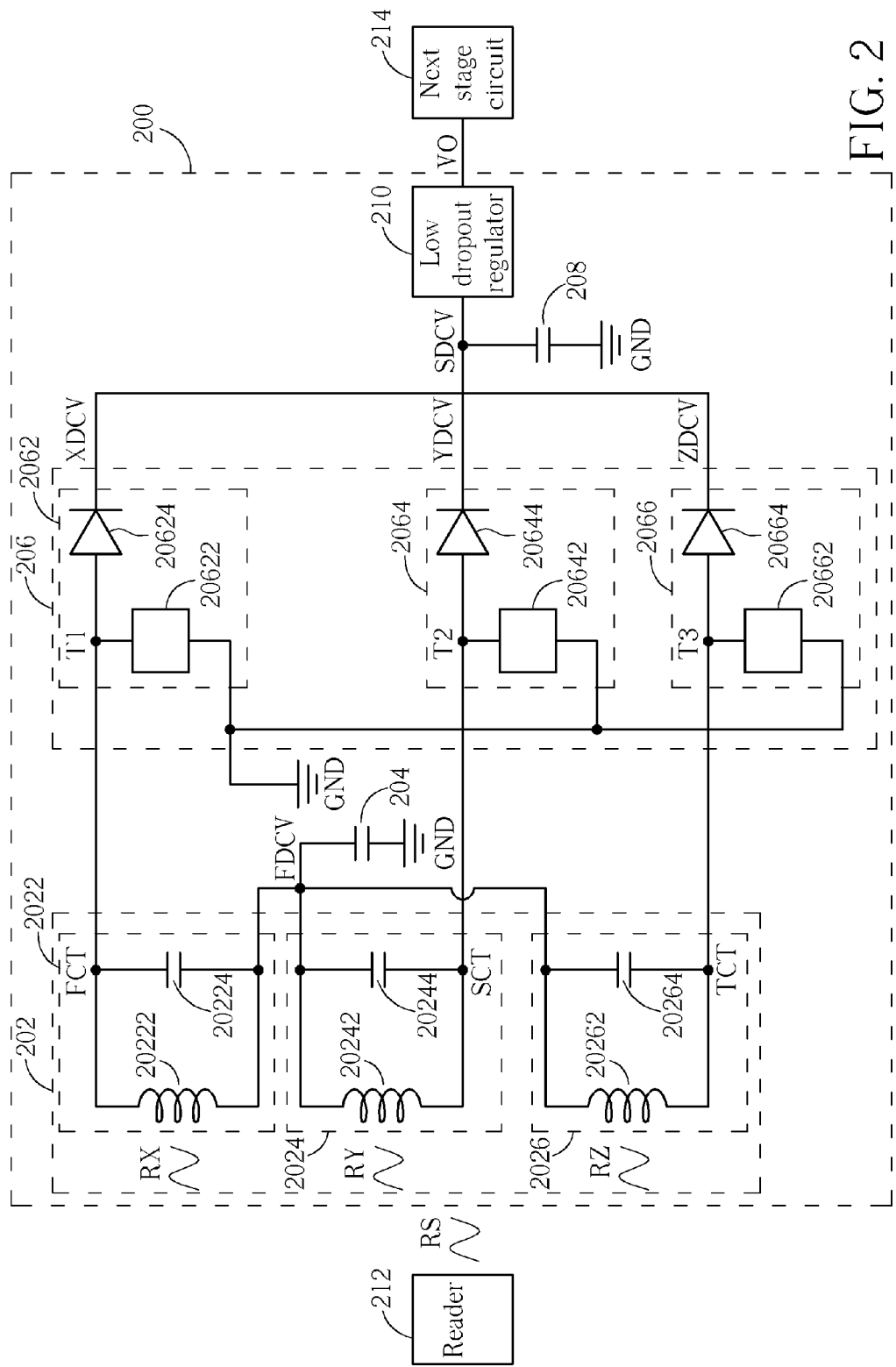
FIG. 2 is a diagram illustrating a circuit for generating a direct current voltage according to an embodiment.

Please refer to FIG. 2. FIG. 2 is a diagram illustrating a circuit 200 for generating a direct current voltage according to an embodiment. The circuit 200 includes a three-axis antenna set 202, a first capacitor 204, a limiting direct current voltage generator 206, a second capacitor 208, and a low dropout regulator 210. The three-axis antenna set 202 has a first coupling terminal FCT for receiving an X-axis component RX of a signal RS transmitted by a reader 212, a second coupling terminal SCT for receiving a Y-axis component RY of the signal RS, a third coupling terminal TCT for receiving a Z-axis component RZ of the signal RS, and an output terminal. The first capacitor 204 is coupled to the output terminal of the three-axis antenna set 202 for generating a first direct current voltage FDCV according to the X-axis component RX, the Y-axis component RY, and the Z-axis component RZ. The limiting direct current voltage generator 206 has a first input terminal T1 coupled to the first coupling terminal FCT of the three-axis antenna set 202 for receiving the X-axis component RX, a second input terminal T2 coupled to the second coupling terminal SCT of the three-axis antenna set 202 for receiving the Y-axis component RY, a third input terminal T3 coupled to the third coupling terminal TCT of the three-axis antenna set 202 for receiving the Z-axis component RZ, a fourth terminal coupled to ground GND, and an output terminal for outputting an X-axis direct current voltage XDCV, a Y-axis direct current voltage YDCV, and a Z-axis direct current voltage ZDCV. The limiting direct current voltage generator 206 is used for converting the X-axis component RX, the Y-axis component RY, and the Z-axis component RZ to generate the X-axis direct current voltage XDCV, the Y-axis direct current voltage YDCV, and the Z-axis direct current voltage ZDCV. The second capacitor 208 is coupled to the output terminal of the limiting direct current voltage generator 206 for generating a second direct current voltage SDCV according to the X-axis direct current voltage XDCV, the Y-axis direct current voltage YDCV, and the Z-axis direct current voltage ZDCV. The low dropout regulator 210 is coupled to the second capacitor 208 for generating a direct current output voltage VO according to the second direct current voltage SDCV.

The three-axis antenna set 202 includes an X-axis antenna 2022, a Y-axis antenna 2024, and a Z-axis antenna 2026. The X-axis antenna 2022 includes an X-axis inductor 20222, and an X-axis capacitor 20224. The X-axis inductor 20222 has a first terminal coupled to the first coupling terminal FCT of the three-axis antenna set 202, and a second terminal coupled to the output terminal of the three-axis antenna set 202, where the X-axis inductor 20222 is used for coupling the X-axis component RX. The X-axis capacitor 20224 has a first terminal coupled to the first coupling terminal FCT of the three-axis antenna set 202, and a second terminal coupled to the output terminal of the three-axis antenna set 202, where the X-axis capacitor 20224 is used for adjusting a resonant frequency of the X-axis antenna 2022. The Y-axis antenna 2024 includes a Y-axis inductor 20242, and a Y-axis capacitor 20244. The Y-axis inductor 20242 has a first terminal coupled to the second coupling terminal SCT of the three-axis antenna set 202, and a second terminal coupled to the output terminal of the three-axis antenna set 202, where the Y-axis inductor 20242 is used for coupling the Y-axis component RY. The Y-axis capacitor 20244 has a first terminal coupled to the second coupling terminal SCT of the three-axis antenna set 202, and a second terminal coupled to the output terminal of the three-axis antenna set 202, where the Y-axis capacitor 20244 is used for adjusting a resonant frequency of the Y-axis antenna 2024. The Z-axis antenna 2026 includes a Z-axis inductor 20262, and a Z-axis capacitor 20264. The Z-axis inductor 20262 has a first terminal coupled to the third coupling terminal TCT of the three-axis antenna set 202, and a second terminal coupled to the output terminal of the three-axis antenna set 202, where the Z-axis inductor 20262 is used for coupling the Z-axis component RZ. The Z-axis capacitor 20264 has a first terminal coupled to the third coupling terminal TCT of the three-axis antenna set 202, and a second terminal coupled to the output terminal of the three-axis antenna set 202, where the Z-axis capacitor 20264 is used for adjusting a resonant frequency of the Z-axis antenna 2026. In addition, the X-axis antenna 2022, the Y-axis antenna 2024, and the Z-axis antenna 2026 share the output terminal of the three-axis antenna set 202 to reduce pin number of the circuit 200 for generating a direct current voltage.

The limiting direct current voltage generator 206 includes an X-axis direct current voltage generation unit 2062, a Y-axis direct current voltage generation unit 2064, and a Z-axis direct current voltage generation unit 2066. The X-axis direct current voltage generation unit 2062 includes a first limiter 20622, and a first diode 20624. The first limiter 20622 has a first terminal coupled to the first input terminal T1 of the limiting direct current voltage generator 206, and a second terminal coupled to the fourth terminal of the limiting direct current voltage generator 206, where the first limiter 20622 is used for limiting a voltage of the first input terminal T1 of the limiting direct current voltage generator 206. The first diode 20624 has a first terminal coupled to the first input terminal T1 of the limiting direct current voltage generator 206, and a second terminal coupled to the output terminal of the limiting direct current voltage generator 206, where the first diode 20624 is used for converting the X-axis component RX to generate the X-axis direct current voltage XDCV. The Y-axis direct current voltage generation unit 2064 includes a second limiter 20642, and a second diode 20644. The second limiter 20642 has a first terminal coupled to the second input terminal T2 of the limiting direct current voltage generator 206, and a second terminal coupled to the fourth terminal of the limiting direct current voltage generator 206, where the second limiter 20642 is used for limiting a voltage of the second input terminal T2 of the limiting direct current voltage generator 206. The second diode 20644 has a first terminal coupled to the second input terminal T2 of the limiting direct current voltage generator 206, and a second terminal coupled to the output terminal of the limiting direct current voltage generator 206, where the second diode 20644 is used for converting the Y-axis component RY to generate the Y-axis direct current voltage YDCV. The Z-axis direct current voltage generation unit 2066 includes a third limiter 20662, and a third diode 20664. The third limiter 20662 has a first terminal coupled to the third input terminal T3 of the limiting direct current voltage generator 206, and a second terminal coupled to the fourth terminal of the limiting direct current voltage generator 206, where the third limiter 20662 is used for limiting a voltage of the third input terminal T3 of the limiting direct current voltage generator 206. The third diode 20664 has a first terminal coupled to the third input terminal T3 of the limiting direct current voltage generator 206, and a second terminal coupled to the output terminal of the limiting direct current voltage generator 206, where the third diode 20664 is used for converting the Z-axis component RZ to generate the Z-axis direct current voltage ZDCV.

As shown in FIG. 2, the three-axis antenna set 202 utilizes the X-axis antenna 2022, the Y-axis antenna 2024, and the Z-axis antenna 2026 to couple the X-axis component RX, the Y-axis component RY, and the Z-axis component RZ of the signal RS transmitted by the reader 212, respectively, for increasing charging efficiency of the second capacitor 208. In addition, as shown in FIG. 2, the first direct current voltage FDCV generated by the first capacitor 204 can boost a voltage of the first coupling terminal FCT, a voltage of the second coupling terminal SCT, and a voltage of the third coupling terminal TCT of the three-axis antenna set 202, so the first direct current voltage FDCV can increase a charging speed of the limiting direct current voltage generator 206 charging the second capacitor 208.

In addition, because the voltage of the first coupling terminal FCT, the voltage of the second coupling terminal SCT, and the voltage of the third coupling terminal TCT vary severely with the signal RS transmitted by the reader 212, another circuit coupled to the first coupling terminal FCT, the second coupling terminal SCT, and/or the third coupling terminal TCT may be damaged. Therefore, the limiting direct current voltage generator 206 utilizes the first limiter 20622, the second limiter 20642, and the third limiter 20662 to limit the voltage of the first input terminal T1, the voltage of the second input terminal T2, and the voltage of the third input terminal T3 of the limiting direct current voltage generator 206 to a first predetermined voltage (such as 6.2V). But, the present invention is not limited to the first predetermined voltage being 6.2V. Therefore, the second direct current voltage SDCV generated by the second capacitor 208 is equal to the first predetermined voltage minus a voltage drop of the first diode 20624 (or the second diode 20644, or the third diode 20664). That is to say, the second direct current voltage SDCV is equal to 5.5V. The low dropout regulator 210 generates the direct current output voltage VO (such as 3.3V) according to the second direct current voltage SDCV for providing the direct current output voltage VO to a next stage circuit 214. But, the present invention is not limited to the direct current output voltage VO being 3.3V.

In addition, the circuit 200 for generating the direct current voltage is used for providing a small current within a short interval T, so a user can calculate a value C of the second capacitor 208 according to the short interval T, a value CV of the small current, and equation (1):

$$C=CV*T/(SDCV-VO) \qquad (1)$$

Figure 3:
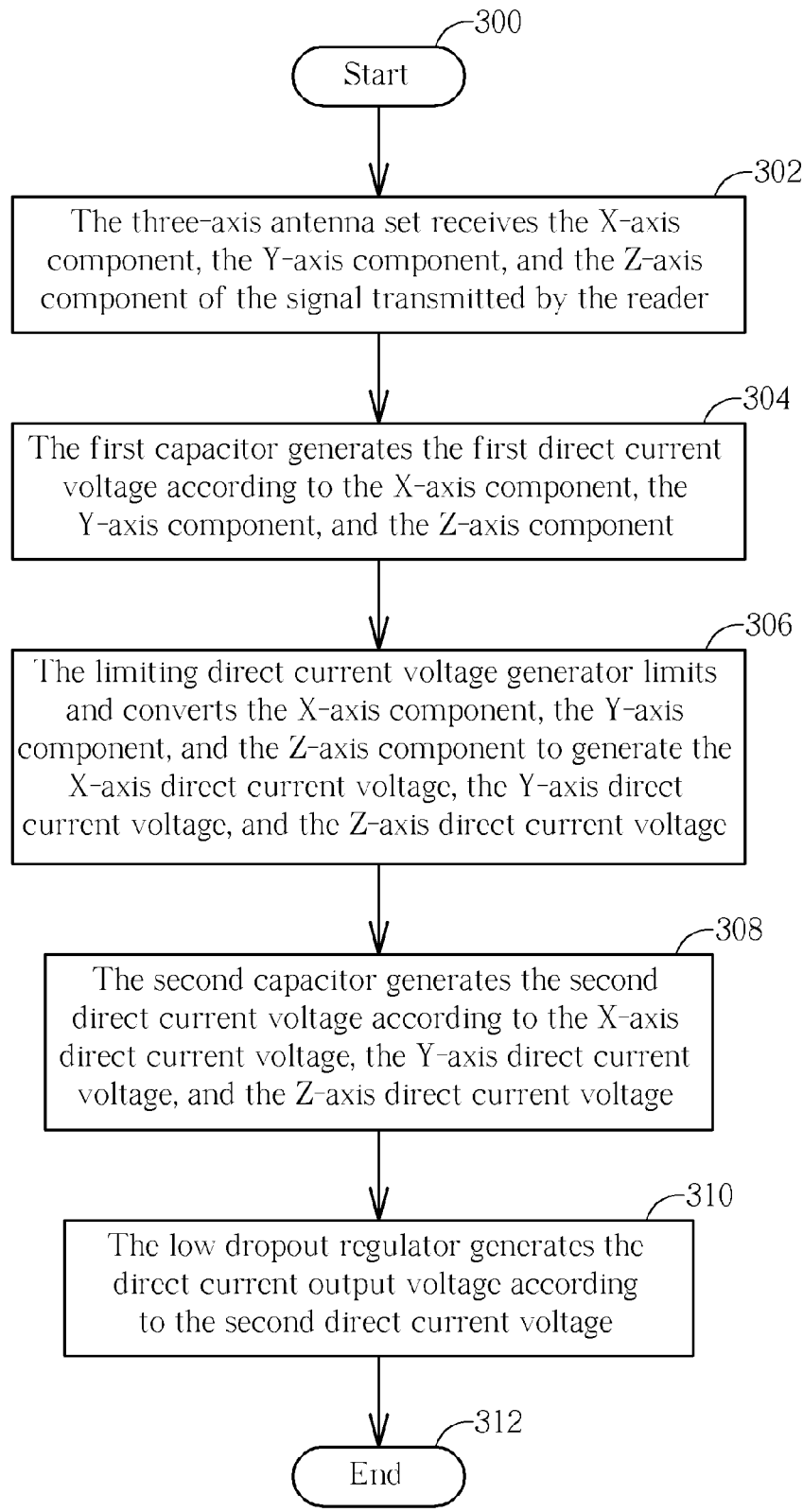
FIG. 3 is a flowchart illustrating a method for generating a direct current voltage according to another embodiment.

Please refer to FIG. 3. FIG. 3 is a flowchart illustrating a method for generating a direct current voltage according to another embodiment. The method in FIG. 3 uses the circuit 200 in FIG. 2 to illustrate the method. Detailed steps are as follows:

Step 300: Start.

Step 302:

The three-axis antenna set 202 receives the X-axis component RX, the Y-axis component RY, and the Z-axis component RZ of the signal RS transmitted by the reader 212.

Step 304:

The first capacitor 204 generates the first direct current voltage FDCV according to the X-axis component RX, the Y-axis component RY, and the Z-axis component RZ.

Step 306:

The limiting direct current voltage generator 206 limits and converts the X-axis component RX, the Y-axis component RY, and the Z-axis component RZ to generate the X-axis direct current voltage XDCV, the Y-axis direct current voltage YDCV, and the Z-axis direct current voltage ZDCV.

Step 308:

The second capacitor 208 generates the second direct current voltage SDCV according to the X-axis direct current voltage XDCV, the Y-axis direct current voltage YDCV, and the Z-axis direct current voltage ZDCV.

Step 310:

The low dropout regulator 210 generates the direct current output voltage VO according to the second direct current voltage SDCV.

Step 312: End.

In Step 302, the three-axis antenna set 202 receiving the X-axis component RX, the Y-axis component RY, and the Z-axis component RZ of the signal RS transmitted by the reader 212 includes the X-axis antenna 2022 receiving the X-axis component RX of the signal RS, the Y-axis antenna 2024 receiving the Y-axis component RY of the signal RS, and the Z-axis antenna 2026 receiving the Z-axis component RZ of the signal RS for increasing the charging efficiency of the second capacitor 208. In Step 304, the first direct current voltage FDCV generated by the first capacitor 204 can boost the voltage of the first coupling terminal FCT, the voltage of the second coupling terminal SCT, and the voltage of the third coupling terminal TCT of the three-axis antenna set 202, so the first direct current voltage FDCV can be used for increasing the charging speed of the limiting direct current voltage generator 206 charging the second capacitor 208. In Step 306, the X-axis direct current voltage generation unit 2062 limits and converts the X-axis component RX to generate the X-axis direct current voltage XDCV through the first diode 20624 and the first limiter 20622; the Y-axis direct current voltage generation unit 2064 limits and converts the Y-axis component RY to generate the Y-axis direct current voltage YDCV through the second diode 20644 and the second limiter 20642; and, the Z-axis direct current voltage generation unit 2066 limits and converts the Z-axis component RZ to generate the Z-axis direct current voltage ZDCV through the third diode 20664 and the third limiter 20662. In Step 308, the second capacitor 208 is charged by the X-axis direct current voltage XDCV, the Y-axis direct current voltage YDCV, and the Z-axis direct current voltage ZDCV to generate the second direct current voltage SDCV. In Step 310, the low dropout regulator 210 generates the direct current output voltage VO for the next stage circuit 214 according to the second direct current voltage SDCV.

To sum up, the circuit for generating the direct current voltage and method thereof utilize the limiting direct current voltage generator to limit the voltage of the first coupling terminal, the voltage of the second coupling terminal, and the voltage of the third coupling terminal of the three-axis antenna set for overcoming a problem of the voltage of the first coupling terminal, the voltage of the second coupling terminal, and the voltage of the third coupling terminal varying severely with the signal transmitted by the reader. Thus, the present invention can avoid another circuit coupled to the first coupling terminal, the second coupling terminal, and/or the third coupling terminal of the three-axis antenna set, and the next stage circuit coupled to the low dropout regulator being damaged.

Those skilled in the art will readily observe that numerous modifications and alterations of the device and method may be made while retaining the teachings of the invention.

What is claimed is:

1. A circuit for generating a direct current voltage, the circuit comprising:

a three-axis antenna set having a first coupling terminal for receiving an X-axis component of a signal transmitted by a reader, a second coupling terminal for receiving a Y-axis component of the signal, a third coupling terminal for receiving a Z-axis component of the signal, and an output terminal;

a first capacitor coupled to the output terminal of the three-axis antenna set for generating a first direct current voltage according to the X-axis component, the Y-axis component, and the Z-axis component;

a limiting direct current voltage generator having a first input terminal coupled to the first coupling terminal of the three-axis antenna set for receiving the X-axis component, a second input terminal coupled to the second coupling terminal of the three-axis antenna set for receiving the Y-axis component, a third input terminal coupled to the third coupling terminal of the three-axis antenna set for receiving the Z-axis component, a fourth terminal coupled to ground, and an output terminal for outputting an X-axis direct current voltage, a Y-axis direct current voltage, and a Z-axis direct current voltage, wherein the limiting direct current voltage generator is used for converting the X-axis component, the Y-axis component, and the Z-axis component to generate the X-axis direct current voltage, the Y-axis direct current voltage, and the Z-axis direct current voltage;

a second capacitor coupled to the output terminal of the limiting direct current voltage generator for generating a second direct current voltage according to the X-axis direct current voltage, the Y-axis direct current voltage, and the Z-axis direct current voltage; and a low dropout regulator coupled to the second capacitor for generating a direct current output voltage according to the second direct current voltage.

2. The circuit of claim 1, wherein the three-axis antenna set comprises:
an X-axis antenna comprising:
an X-axis inductor having a first terminal coupled to the first coupling terminal of the three-axis antenna set, and a second terminal coupled to the output terminal of the three-axis antenna set; and
an X-axis capacitor having a first terminal coupled to the first coupling terminal of the three-axis antenna set, and a second terminal coupled to the output terminal of the three-axis antenna set, wherein the X-axis capacitor is used for adjusting a resonant frequency of the X-axis antenna;
a Y-axis antenna comprising:
a Y-axis inductor having a first terminal coupled to the second coupling terminal of the three-axis antenna set, and a second terminal coupled to the output terminal of the three-axis antenna set; and
a Y-axis capacitor having a first terminal coupled to the second coupling terminal of the three-axis antenna set, and a second terminal coupled to coupled to the output terminal of the three-axis antenna set, wherein the Y-axis capacitor is used for adjusting a resonant frequency of the Y-axis antenna; and
a Z-axis antenna comprising:
a Z-axis inductor having a first terminal coupled to the third coupling terminal of the three-axis antenna set, and a second terminal coupled to the output terminal of the three-axis antenna set; and
a Z-axis capacitor having a first terminal coupled to the third coupling terminal of the three-axis antenna set, and a second terminal coupled to the output terminal of the three-axis antenna set, wherein the Z-axis capacitor is used for adjusting a resonant frequency of the Z-axis antenna.

3. The circuit of claim 1, wherein the limiting direct current voltage generator comprises:
an X-axis direct current voltage generation unit comprising:
a first limiter having a first terminal coupled to the first input terminal of the limiting direct current voltage generator, and a second terminal coupled to the fourth terminal of the limiting direct current voltage generator, wherein the first limiter is used for limiting a voltage of the first input terminal of the limiting direct current voltage generator; and
a first diode having a first terminal coupled to the first input terminal of the limiting direct current voltage generator, and a second terminal coupled to the output terminal of the limiting direct current voltage generator, wherein the first diode is used for converting the X-axis component to generate the X-axis direct current voltage;
a Y-axis direct current voltage generation unit comprising:
a second limiter having a first terminal coupled to the second input terminal of the limiting direct current voltage generator, and a second terminal coupled to the fourth terminal of the limiting direct current voltage generator, wherein the second limiter is used for limiting a voltage of the second input terminal of the limiting direct current voltage generator; and
a second diode having a first terminal coupled to the first input terminal of the limiting direct current voltage generator, and a second terminal coupled to the output terminal of the limiting direct current voltage generator, wherein the second diode is used for converting the Y-axis component to generate the Y-axis direct current voltage; and
a Z-axis direct current voltage generation unit comprising:
a third limiter having a first terminal coupled to the third input terminal of the limiting direct current voltage generator, and a second terminal coupled to the fourth terminal of the limiting direct current voltage generator, wherein the third limiter is used for limiting a voltage of the third input terminal of the limiting direct current voltage generator; and
a third diode having a first terminal coupled to the third input terminal of the limiting direct current voltage generator, and a second terminal coupled to the output terminal of the limiting direct current voltage generator, wherein the third diode is used for converting the Z-axis component to generate the Z-axis direct current voltage.

4. The circuit of claim 1, wherein the first direct current voltage is used for increasing a charging speed of the limiting direct current voltage generator for charging the second capacitor.

5. A method for generating a direct current voltage, the method comprising:
a three-axis antenna set receiving an X-axis component, a Y-axis component, and a Z-axis component of a signal transmitted by a reader;
a first capacitor generating a first direct current voltage according to the X-axis component, the Y-axis component, and the Z-axis component;
a limiting direct current voltage generator limiting and converting the X-axis component, the Y-axis component, and the Z-axis component to generate an X-axis direct current voltage, a Y-axis direct current voltage, and a Z-axis direct current voltage;
a second capacitor generating a second direct current voltage according to the X-axis direct current voltage, the Y-axis direct current voltage, and the Z-axis direct current voltage; and
a low dropout regulator generating a direct current output voltage according to the second direct current voltage.

6. The method of claim 5, wherein the three-axis antenna set receiving the X-axis component, the Y-axis component, and the Z-axis component of the signal transmitted by the reader comprises:
an X-axis antenna receiving the X-axis component of the signal;
a Y-axis antenna receiving the Y-axis component of the signal; and
a Z-axis antenna receiving the Z-axis component of the signal.

7. The method of claim 5, wherein the limiting direct current voltage generator limiting and converting the X-axis component, the Y-axis component, and the Z-axis component to generate the X-axis direct current voltage, the Y-axis direct current voltage, and the Z-axis direct current voltage comprises:
an X-axis direct current voltage generation unit limiting and converting the X-axis component to generate the X-axis direct current voltage;

a Y-axis direct current voltage generation unit limiting and converting the Y-axis component to generate the Y-axis direct current voltage; and a Z-axis direct current voltage generation unit limiting and converting the Z-axis component to generate the Z-axis direct current voltage.

8. The method of claim 5, wherein the first direct current voltage is used for increasing a charging speed of the limiting direct current voltage generator for charging the second capacitor.

* * * * *